Feb. 23, 1932.  F. W. BAURMANN  1,846,539
EXPANSION JOINT FOR WELL LINERS
Filed April 29, 1929
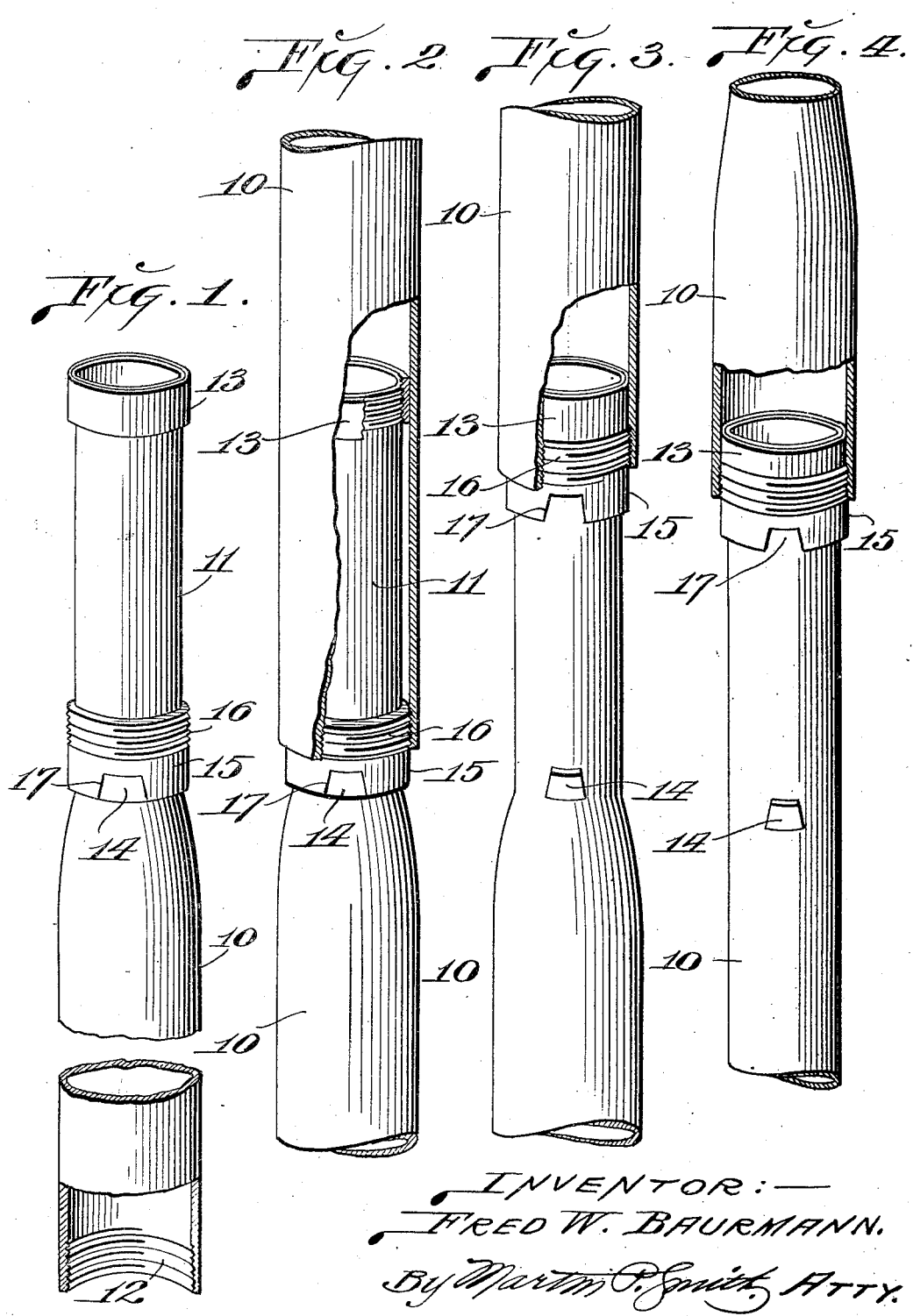
INVENTOR:—
FRED W. BAURMANN.
By Martin P. Smith, Atty.

Patented Feb. 23, 1932

1,846,539

UNITED STATES PATENT OFFICE

FRED W. BAURMANN, OF CARTAGENA, COLOMBIA

EXPANSION JOINT FOR WELL LINERS

Application filed April 29, 1929. Serial No. 359,079.

My invention relates generally to the liner or screen pipes of deep wells and more particularly to an expansion joint that is utilized in the pipe, and the principal object of my invention is to provide a relatively simple, practical and inexpensive expansion joint that provides a telescopic connection between the pipe sections and which is effective in enabling the liner pipe to be readily pulled or withdrawn from the well hole in the event it is desired to clean out or deepen the well hole, and said liner joint being also effective where a cement job becomes necessary as a result of water breaking into the well hole.

A further object of my invention is to provide a liner expansion joint that is inexpensive of manufacture, strong and durable in construction, capable of being readily assembled or taken apart, and which will effect a material saving of time, labor and expense that is ordinarily involved in the pulling of the liner from the well hole.

With the foregoing and other objects in view, my invention consists in certain novel features of construction and arrangement of parts that will hereinafter be more fully described and claimed and illustrated in the accompanying drawings, in which:—

Fig. 1 is a perspective view of a liner pipe construction constructed in accordance with my invention and having the necessary parts applied thereto to produce the improved expansion joint.

Fig. 2 is a perspective view of the joint with parts broken away and showing the same in contracted condition.

Fig. 3 is a perspective view partly in section and showing the joint in expanded or extended condition.

Fig. 4 is a perspective view partly in section of a modified form of the joint.

Referring by numerals to the accompanying drawings and particularly to the form of joint illustrated in Figs. 1, 2 and 3, 10 designates a pipe or tube that is adapted to function as one of the sections of a deep well liner or screen and which pipe has a short portion 11 at its upper end contracted or reduced in diameter, such reduced portion being of any desired length, for instance eighteen or twenty inches.

At the lower end of the pipe section 10 the same is internally threaded as designated by 12, and secured to the upper end of the reduced or contracted portion 11 of the pipe section is a collar 13.

Secured in any suitable manner, preferably by welding, on the lower portion of the reduced or contracted upper end 11 of the pipe section is a lug 14 and mounted on the portion 11 so as to slide freely lengthwise between the fixed collar 13 and the lug 14 is a collar 15 having its upper portion externally threaded, as designated by 16, and which threaded portion is adapted to receive the internally threaded lower end of an adjacent liner section 10.

Formed in the lower portion of the collar 15 is a notch 17, which latter is adapted to receive the lug 14, and thus the collar 15 is held against rotary movement when the lower end of a liner 10 is screwed onto the threaded upper portion of said collar 15.

It will be understood that the coller 15 is positioned on the contracted or reduced upper end portion 11 of the liner section and these operations may be carried out in the machine shop where the liner sections are produced and assembled and before they are delivered to the well or point of use.

At the well where the liner is to be installed one of the sections 10 is inserted through the rotary table or spider at the top of the well with the large end of the pipe section lowermost and when this first section has been lowered for approximately its length into the well hole the externally threaded lower end of a second liner section is slipped down over the contracted upper portion 11 of the first section and said internally threaded lower end is screwed onto the externally threaded portion 16 of the collar 15, the latter being held against rotation by engagement of the lug 14 in the notch 17.

Thus the lower end of the second liner section is connected to the upper section of the first liner section by an expansion joint having a longitudinal movement of eighteen or twenty inches and this manner of assembling or connecting the joints is continued as the subsequent liner sections are connected to the sections first assembled.

Thus when the complete liner is positioned in the well hole the various sections that make up the complete liner are connected to each other by expansion joints, the same being contracted due to the weight of the upper liner sections and the collars 15 that are screwed into the lower ends of the liner sections resting on the lugs 14.

When it becomes necessary to pull the liner the upper pipe or section thereof is pulled upwardly the length of the expansion joint, or, in other words until the upper edge of collar 15 engages against the underside of the corresponding collar 13, which movement approximates eighteen or twenty inches or whatever the length of the expansion joint may be.

When the collar 15 engages the collar 13, as just described, and the upward pull on the upper one of the liner sections is continued, the next lower liner section will be pulled upwardly a distance equal to the length of the expansion joint between its lower end and the third one of the liner sections, and such action continues throughout the length of the entire liner so that each liner section is drawn upwardly a short distance before upward movement is imparted to the next lower section.

As a result of this arrangement it is a comparatively easy matter to pull the entire string of lining pipes.

In a four inch liner string having twenty expansion joints the space gained for surplus sand and gravel that is packed around the liner amounts to approximately forty-five hundred cubic inches, thereby materially decreasing the friction on the outer surface of the pipe during pulling operations.

In the construction illustrated in Figs. 1, 2 and 3, the upper ends of the liner pipe sections 10 are slightly contracted or reduced in diameter and thus when the liner is positioned in the well hole with the joints contracted, the external diameter of the liner is substantially the same throughout its length. In the event that it is desired to provide a liner wherein the same internal diameter is maintained throughout its length, the lower end of each liner pipe section or that portion which slips over the upper end of the next adjacent lower section is expanded, as illustrated in Fig. 4.

Thus it will be seen that I have provided an expansion joint for deep well liners that is relatively simple in construction, inexpensive of manufacture, and which is effective in materially decreasing the time, labor and expense that are ordinarily involved in the pulling of wall lining tubes or screens.

It will be understood that minor changes in the size, form and construction of the various parts of my improved expansion joint for well liners may be made and substituted for those herein shown and described without departing from the spirit of my invention, the scope of which is set forth in the appended claim.

I claim as my invention:

A well liner section, comprising a tube having a portion at one end reduced in diameter, the opposite end of said tube being internally threaded, a collar secured to the outer end of the reduced end portion of said tube, lugs projecting outwardly from the inner end of said reduced end portion of the tube, a collar mounted for sliding movement on the reduced end portion of the tube between the fixed collar and said lugs, the outer end of which collar is externally threaded for engagement with the internally threaded end of the next adjacent tube section and the inner end of said sliding collar being provided with recesses for the accommodation of the lugs at the inner end of the reduced portion of said tube.

In testimony whereof I affix my signature.

FRED W. BAURMANN.